United States Patent
Aabye et al.

(10) Patent No.: US 12,245,035 B2
(45) Date of Patent: Mar. 4, 2025

(54) USER AUTHENTICATION AT ACCESS CONTROL SERVER USING MOBILE DEVICE

(71) Applicant: Visa International Service Association, San Francisco, CA (US)

(72) Inventors: Christian Aabye, Redwood City, CA (US); Alexandre Pierre, San Mateo, CA (US); Pawel Chrobok, Alameda, CA (US)

(73) Assignee: Visa International Service Association, San Francisco, CA (US)

( * ) Notice: Subject to any disclaimer, the term of this patent is extended or adjusted under 35 U.S.C. 154(b) by 123 days.

(21) Appl. No.: 17/800,198

(22) PCT Filed: Mar. 5, 2021

(86) PCT No.: PCT/US2021/021044
§ 371 (c)(1),
(2) Date: Aug. 16, 2022

(87) PCT Pub. No.: WO2021/178773
PCT Pub. Date: Sep. 10, 2021

(65) Prior Publication Data
US 2023/0062507 A1    Mar. 2, 2023

Related U.S. Application Data
(60) Provisional application No. 62/985,449, filed on Mar. 5, 2020.

(51) Int. Cl.
*H04W 12/08* (2021.01)
*H04L 9/32* (2006.01)
(Continued)

(52) U.S. Cl.
CPC .......... *H04W 12/08* (2013.01); *H04L 9/3271* (2013.01); *H04L 63/0838* (2013.01); *H04W 12/06* (2013.01); *H04W 12/068* (2021.01)

(58) Field of Classification Search
CPC ... H04W 12/08; H04W 12/068; H04W 12/06; H04L 63/0838; H04L 9/3271
See application file for complete search history.

(56) References Cited

U.S. PATENT DOCUMENTS

| 8,121,856 B2 | 2/2012 | Huster et al. |
| 8,380,629 B2 | 2/2013 | Carson et al. |

(Continued)

FOREIGN PATENT DOCUMENTS

| WO | 2013043740 A1 | 3/2013 |
| WO | 2019013854 A1 | 1/2019 |

OTHER PUBLICATIONS

PCT/US2021/021044, "International Search Report and Written Opinion", Jun. 28, 2021, 10 pages.
(Continued)

*Primary Examiner* — Shirley X Zhang
(74) *Attorney, Agent, or Firm* — Kilpatrick Townsend & Stockton LLP

(57) ABSTRACT

A method is disclosed. The method includes receiving, by an access control server, an authentication request message comprising a credential or a token from an access device, after the access device receives the credential or the token from a portable device of a user. The method also includes responsive to receiving the authentication request message, transmitting, by the access control server, a challenge message to a user device associated with the user; generating, by the access control server, an authentication indicator. The method also includes transmitting, by the access control
(Continued)

server, an authentication response message including the authentication indicator to the access device.

20 Claims, 5 Drawing Sheets

(51) Int. Cl.
*H04L 9/40* (2022.01)
*H04W 12/06* (2021.01)

(56) References Cited

U.S. PATENT DOCUMENTS

| | | | |
|---|---|---|---|
| 8,762,279 | B2 | 6/2014 | Weller et al. |
| 9,485,253 | B2 | 11/2016 | Carlson et al. |
| 9,898,740 | B2 | 2/2018 | Weller et al. |
| 10,255,601 | B2 | 4/2019 | Makhotin |
| 11,356,257 | B2 * | 6/2022 | Law .................. G06F 21/33 |
| 11,743,042 | B2 * | 8/2023 | Law .................. G06Q 20/4014 |
| | | | 713/176 |
| 2008/0319896 | A1 | 12/2008 | Carlson et al. |
| 2008/0319904 | A1 | 12/2008 | Carlson et al. |
| 2011/0208658 | A1 * | 8/2011 | Makhotin .......... G06Q 20/401 |
| | | | 235/380 |
| 2012/0123882 | A1 | 5/2012 | Carlson et al. |
| 2012/0158591 | A1 | 6/2012 | Hammad et al. |
| 2013/0160098 | A1 | 6/2013 | Carlson et al. |
| 2013/0198077 | A1 | 8/2013 | Carlson et al. |
| 2014/0020073 | A1 * | 1/2014 | Ronda ................. H04L 63/0853 |
| | | | 726/7 |
| 2014/0025579 | A1 | 1/2014 | Nilsson |
| 2015/0088756 | A1 * | 3/2015 | Makhotin ........... G06Q 20/401 |
| | | | 705/71 |
| 2016/0057143 | A1 | 2/2016 | Carlson et al. |
| 2016/0277380 | A1 | 9/2016 | Wagner et al. |
| 2017/0186003 | A1 | 6/2017 | Monaghan |
| 2017/0366530 | A1 | 12/2017 | Dominguez et al. |
| 2018/0374090 | A1 | 12/2018 | Hammad et al. |
| 2019/0108506 | A1 | 4/2019 | Vokes et al. |
| 2019/0188664 | A1 | 6/2019 | Carlson et al. |
| 2019/0333055 | A1 | 10/2019 | Mohammed et al. |
| 2021/0217005 | A1 * | 7/2021 | Mehrhoff ........... G06Q 20/4014 |
| 2021/0320922 | A1 * | 10/2021 | Furhmann ............ H04L 9/3213 |
| 2022/0156742 | A1 * | 5/2022 | Gupta ................. G06Q 20/202 |
| 2022/0198440 | A1 * | 6/2022 | Kulkarni ............. G06Q 20/405 |
| 2022/0230166 | A1 * | 7/2022 | Balasubramanian ........................ |
| | | | G06Q 20/4016 |
| 2023/0067023 | A1 * | 3/2023 | Chikatamalla ....... G06Q 20/027 |

OTHER PUBLICATIONS

EP21763703.2 , "Extended European Search Report", Apr. 28, 2023, 7 pages.

* cited by examiner

USER AUTHENTICATION AT ACCESS CONTROL SERVER USING MOBILE DEVICE

CROSS-REFERENCE TO RELATED APPLICATIONS

This application is a U.S. National Stage of PCT Application PCT/US2021/021044, filed on Mar. 5, 2021, which claims the benefit of and priority to U.S. provisional application No. 62/985,449, filed on Mar. 5, 2020, which are herein incorporated by reference in their entirety.

BACKGROUND

Existing systems that allow users to access resources such as secure locations, goods or services, or secure data, require those users to enter sensitive information into an access device such as an access terminal. In a typical situation, a user may need to enter a secret, such as a known access code (e.g., a PIN code) into an access terminal such as a transit gate, a point of sale terminal, or kiosk. Conventional access devices are typically located at resource providers and they are typically manufactured so that they can securely process any secrets that are entered into them.

In recent years, many commercial off-the-shelf devices such as mobile phones have been used as access devices. This raises security issues, since conventional mobile devices such as mobile phones and tablet computers may not have been manufactured to specifically receive and process user secrets. As such, commercial-off-the-shelf devices are potentially more vulnerable to hacking and compromise than conventional access devices that are manufactured for dedicated purposes.

Also, having a user enter a secret into an access device also introduces security issues. For example, some access devices are not secure, and secrets can be stolen from access devices by hackers and other unauthorized persons. Further, in some cases, after a user enters a secret into an access device via a keypad of the access device, the heat produced by the user's fingers can remain on the keys of the keypad. Some have used infrared devices to determine the keys that were pressed by the person and determine the user's secret. As such, entry of secrets into access devices can be problematic for other reasons.

Embodiments of the invention address these and other problems individually.

BRIEF SUMMARY

One embodiment includes a method comprising: receiving, by an access device, a credential or a token from a portable device associated with a user in an interaction; responsive to receiving the credential or the token from the portable device, transmitting, by the access device, an authentication request message comprising the credential or the token to an access control server, which transmits a challenge message to a user device associated with the user; receiving, by the access device, an authentication response message comprising an authentication indicator from the access control server; and transmitting, by the access device, an authorization request message comprising the authentication indicator, and the credential or the token to an authorizing entity computer. The authorizing entity computer can determine whether to authorize the interaction using the credential or the token, and the authentication indicator. In some embodiments, the authentication indicator may be a cryptogram.

Another embodiment of the invention includes an access device comprising: a processor; and a non-transitory computer readable medium, the non-transitory computer readable medium comprising instructions executable by the processor, to cause the access device to: receive a credential or a token from a portable device associated with a user in an interaction; responsive to receiving the credential or the token from the portable device, transmit an authentication request message comprising the credential or the token to an access control server, which transmits a challenge message to a user device associated with the user; receive an authentication response message comprising an authentication indicator from the access control server; and transmit an authorization request message comprising the authentication indicator, and the credential or the token to an authorizing entity computer. The authorizing entity computer can determine whether to authorize the interaction using the credential or the token, and the authentication indicator.

Another embodiment of the invention includes a method comprising: receiving, by an access control server, an authentication request message comprising a credential or a token from an access device, after the access device receives the credential or the token from a portable device of a user; responsive to receiving the authentication request message, transmitting, by the access control server, a challenge message to a user device associated with the user; obtaining, by the access control server, an authentication indicator; and transmitting, by the access control server, an authentication response message comprising the authentication indicator to the access device.

Another embodiment of the invention includes an access control server comprising a processor, and a computer readable medium coupled to the processor. The computer readable medium comprises instructions, which when executed by the processor, causes the access control server to: receive an authentication request message comprising a credential or a token from an access device, after the access device receives the credential or the token from a portable device of a user; responsive to receiving the authentication request message, transmit a challenge message to a user device associated with the user; obtain an authentication indicator; and transmit an authentication response message comprising the authentication indicator to the access device.

These and other embodiments of the invention are described in further detail below.

DETAILED DESCRIPTION

Figure 1:
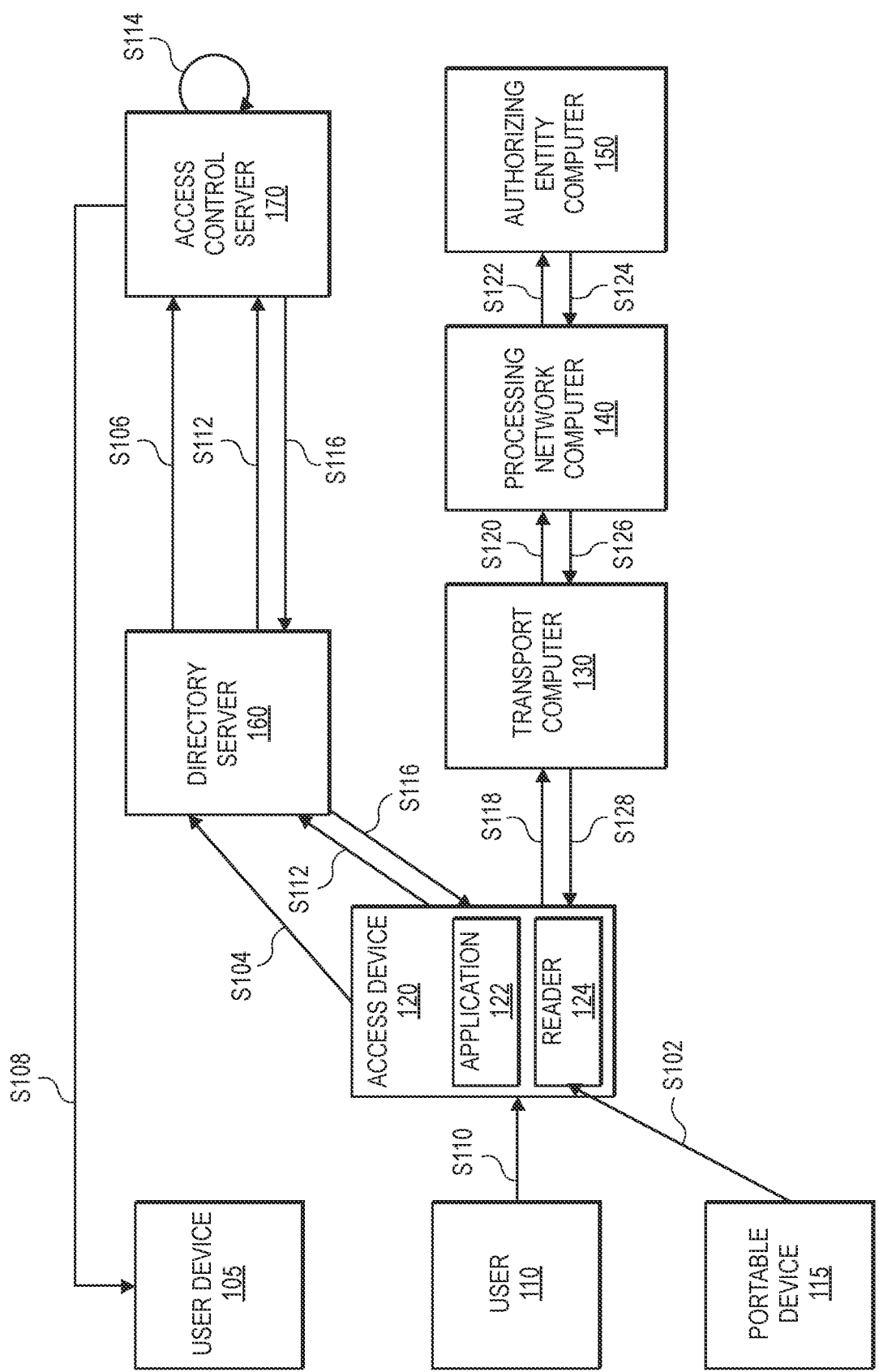
FIG. 1 shows block diagram of a system with a flow diagram according to an embodiment.

Prior to discussing embodiments, some terms can be described in detail.

A "user" may include an individual or a computational device. In some embodiments, a user may be associated with one or more personal accounts and/or mobile devices. In some embodiments, the user may be a cardholder, account holder, or consumer.

A "user device" may be any suitable device that a user can interact with (e.g., a payment card or mobile phone). User devices may be in any suitable form. Some examples of user devices include cards (e.g., payment cards such as credit, debit, or prepaid cards) with magnetic stripes or contactless elements (e.g., including contactless chips and antennas), cellular phones, PDAs, personal computers (PCs), tablet computers, and the like. In some embodiments, where a user device is a mobile device, the mobile device may include a display, a memory, a processor, a computer-readable medium, and any other suitable component. In some embodiments, the user device may incorporate a portable device. For example, the user device may be a mobile phone that can also perform functions like a portable device such as a payment device.

A "mobile device" (sometimes referred to as a mobile communication device) may comprise any suitable electronic device that may be transported and operated by a user, which may also provide remote communication capabilities to a network. A mobile communication device may communicate using a mobile phone (wireless) network, wireless data network (e.g., 3G, 4G or similar networks), Wi-Fi, Bluetooth, Bluetooth Low Energy (BLE), Wi-Max, or any other communication medium that may provide access to a network such as the Internet or a private network. Examples of mobile devices include mobile phones (e.g., cellular phones), PDAs, tablet computers, net books, laptop computers, wearable devices (e.g., watches), vehicles such as automobiles and motorcycles, personal music players, hand-held specialized readers, etc. A mobile device may comprise any suitable hardware and software for performing such functions, and may also include multiple devices or components (e.g., when a device has remote access to a network by tethering to another device—i.e. using the other device as a modem-both devices taken together may be considered a single mobile device).

A "contactless" communication may be a communication in which data is exchanged between two devices without the need for the devices to be physically coupled. Without limiting the generality of the foregoing, "contactless" communication can include data transmissions by near-field communication (NFC) transceiver, laser, radio frequency, infrared communications, or other radio frequency or wireless communication protocols such as Bluetooth, Bluetooth Low Energy (BLE), Wi-FI, iBeacon, etc.

An "application" may be a computer program that is used for a specific purpose. Examples of applications may include transit applications, secure data access applications, banking applications, digital wallet applications, event ticketing applications, loyalty rewards applications, etc. In some embodiments, an application may be associated with an account of the user maintained by a resource or service provider (e.g., a bank account, a mass transit prepaid account, a building access account, etc.).

An "access device" may be any suitable device for providing access to an external computer system. An access device may be in any suitable form. Some examples of access devices include point of sale (POS) devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, websites, and the like. An access device may use any suitable contact or contactless mode of operation to send or receive data from, or associated with, a mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a mobile device.

"Access data" may include any suitable data that can be used to access a resource or create data that can access a resource. In some embodiments, access data may be account information for a payment account. Account information may include a PAN, payment token, expiration date, verification values (e.g., CVV, CVV2, dCVV, dCVV2), etc. In other embodiments, access data may be data that can be used to activate account data. For example, in some cases, account information may be stored on a mobile device, but may not be activated until specific information is received by the mobile device. In other embodiments, access data could include data that can be used to access a location. Such access data may be ticket information for an event, data to access a building, transit ticket information, etc. In yet other embodiments, access data may include data used to obtain access to sensitive data. Examples of access data may include codes or other data that are needed by a server computer to grant access to the sensitive data.

"Authentication data" may include any data suitable for authenticating a user or mobile device. Authentication data may be obtained from a user or a device that is operated by the user. Examples of authentication data obtained from a user may include secrets such as PINs (personal identification numbers), biometric data, passwords, etc. Examples of authentication data that may be obtained from a device may be include device serial numbers, hardware secure element identifiers, device fingerprints, phone numbers, IMEI numbers, etc.

A "secret" can be information that is not known or unseen by others. A secret may only be known to a user. For example, a PIN, password, biometric sample biometric template, or other data specific to and/or only known to a user may be a secret. A derivative of a secret may be information that is derived from the secret. For example, an encrypted secret or a secret that is concatenated with other information may be derivatives of a secret.

A "key" or a "cryptographic key" may include a piece of information that is used in a cryptographic algorithm to transform data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

An "access device key" may be a cryptographic key that is used by an access device in an interaction.

An "authorizing entity" may be an entity that authorizes a request, typically using an authorizing computer to do so. An authorizing entity may be an issuer, a governmental agency, a document repository, an access administrator, etc. An "issuer" may typically include a business entity (e.g., a bank) that maintains an account for a user. An issuer may also issue payment credentials stored on a user device, such as a cellular telephone, smart card, tablet, or laptop to the user.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like. In other embodiments, an interaction can include a payment transaction in which two devices can interact to facilitate a payment.

"Interaction data" can include data related to and/or recorded during an interaction. In some embodiments, interaction data can be transaction data of the network data. Transaction data can comprise a plurality of data elements with data values.

A "credential" may be any suitable information that serves as reliable evidence of worth, ownership, identity, or authority. A credential may be a string of numbers, letters, or any other suitable characters that may be present or contained in any object or document that can serve as confirmation.

A "value credential" may be information associated with worth. Examples of value credentials include payment credentials, coupon identifiers, information needed to obtain a promotional offer, etc.

"Payment credentials" may include any suitable information associated with an account (e.g., a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Payment credentials may be any information that identifies or is associated with a payment account. Payment credentials may be provided in order to make a payment from a payment account. Payment credentials can also include a user name, an expiration date, a gift card number or code, and any other suitable information.

A "token" may be a substitute value for a credential. A token may be a string of numbers, letters, or any other suitable characters. Examples of tokens include access tokens such as payment tokens, data that can be used to access secure systems or locations, etc.

A "payment token" may include an identifier for a payment account that is a substitute for an account identifier, such as a primary account number (PAN) and/or an expiration date. For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which sensitive data is replaced with substitute data. For example, a real credential (e.g., a primary account number (PAN)) may be tokenized by replacing the real account identifier with a substitute number that may be associated with the real credential. Further, tokenization can be applied to any other information to substitute the underlying information with a token. "Token exchange" or "de-tokenization" can be a process of restoring the data that was substituted during tokenization. For example, a token exchange may include replacing a payment token with its associated primary account number (PAN). Further, de-tokenization or token exchange may be applied to any other information to retrieve the substituted information from a token. In some embodiments, token exchange can be achieved via a transactional message, such as an ISO message, an application programming interface (API), or another type of web interface (e.g., web request).

A "token service computer" can include a system that that services tokens. In some embodiments, a token service computer can facilitate requesting, determining (e.g., generating) and/or issuing tokens, as well as maintaining an established mapping of tokens to primary account numbers (PANs) in a repository (e.g., a token vault). In some embodiments, the token service computer may establish a token assurance level for a given token to indicate the confidence level of the token to PAN binding. The token service computer may include or be in communication with a token vault where the generated tokens are stored. The token service computer may support token processing of payment transactions submitted using tokens by de-tokenizing the token to obtain the actual PAN.

An "authorization request message" may be a message that requests authorization for an interaction. In some embodiments, an authorization request message may comprise an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include a credential such as a primary account number that may be associated with a payment device or payment account, or a token that is associated with the primary account number. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message. In some embodiments, it may be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g., POS equipment) that indicates approval of the transaction. The code may serve as proof of authorization.

A "server computer" is typically a powerful computer or cluster of computers. For example, the server computer can be a large mainframe, a minicomputer cluster, or a group of servers functioning as a unit. In one example, the server computer may be a database server coupled to a web server.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "resource provider" can be any suitable entity that provides resources (e.g., goods, services, access to secure data, access to locations, or the like) during a transaction. For example, a resource providing entity can be a merchant, a venue operator, a building owner, a governmental entity, etc. A "merchant" may typically be an entity that engages in transactions and can sell goods or services, or provide access to goods or services.

A "portable device" may be a device that can be carried by a user. Portable devices may have capabilities for storing, processing, and communicating information. They may also store credentials such as payment credentials. A portable device may have a way of generating and or storing cryptographic information for additional security. Examples of portable devices include laptops, mobile phones, payment cards, and key fobs.

An "acquirer" may be a financial institution associated with a resource provider. Acquirers typically provide resource providers with a bank account, and in some cases, transaction accepting infrastructure. Generally, after a transaction has been authorized and as part of the settlement process, funds are transferred from the issuer to resource provider's account at the acquirer. The acquirer may also communicate payment transaction status with the resource provider. The acquirer may operate an acquirer computer, which may generically be a transport computer.

An "issuer" may be a financial institution, such as a bank, that creates and maintains financial accounts for account holders. An issuer or issuing bank may issue and maintain financial accounts for consumers. The issuer of a particular consumer account may determine whether or not to approve or deny specific transactions. An issuer may authenticate a consumer and release funds to an acquirer if transactions are approved (e.g., a consumer's account has sufficient available balance and meets other criteria for authorization or authentication).

A "payment processing network" may be data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. Authorization, settlement, and clearing may be done at the same time (substantially simultaneously, e.g., within a few minutes or hours) or may be done as part of a batch settlement process (e.g., at the end of the day or week). The payment processing network may include a server computer. The payment processing network may use any suitable wired or wireless network, including the internet.

An "access control server" (ACS) can be a server computer that can provide authentication processing. In some embodiments, an access control server can provide issuers with the ability to authenticate presenters (e.g., consumers, users) during a transaction such as a remote or face-to-face purchase transaction.

A "directory server" can be used to route messages between different endpoints. In some embodiments, a directory server can route enrollment and authentication information between a merchant plug-in (MPI) in an access device, and issuer's ACS.

A "merchant plug-in" (MPI) can be a component that operates in an acquirer domain in embodiments. In the online environment, it performs various authentication functions on behalf of the merchant or resource provider. Such functions include determining whether authentication is available for a card number, and validating a digital signature in an authentication message.

An "authentication indicator" may include some type of signal that authentication has been performed. In some embodiments, the authentication indicator may be in the form of a cryptogram. In other embodiments, the authentication indicator could be a code or some binary value which indicates that an entity such as an access control server or even a user device has authenticated the user of an interaction.

One embodiment includes a method. The method includes receiving, by an access device, a credential or a token from a portable device associated with a user in an interaction. Responsive to receiving the credential or the token from the portable device, the access device transmits an authentication request message comprising the credential or the token to an access control server. The access control server then transmits a challenge message to a user device associated with the user. In some embodiments, the challenge message may comprise a temporary code such as a one-time password. The user receive the temporary code and can input it into the access device. In other embodiments, the challenge message may comprise a request for the user to provide a known secret to a local application on the user device. The local application may be affiliated with the access control server. In such embodiments, the access control server can receive either the temporary code from the access device, or the secret from the local application on the user device. The access control server can then verify that the temporary code is the same as the one that was transmitted to the user device. Or, the access control server can verify the user's secret. In both cases, the access control server can validate that the user is the authentic user, and then transmit an authentication response message comprising a cryptogram or other type of authentication indicator to the access device.

After the authentication response message is received by the access device, the access device then generates and transmits an authorization request message comprising the authentication indicator (e.g., a cryptogram), and the credential or the token to an authorizing entity computer. The authorizing entity computer then determines whether or not to authorize the interaction using the credential or the token, and the authentication indicator.

FIG. 1 shows an interaction processing system, with an overlying flow diagram illustrating methods according to embodiments. The system of FIG. 1 can include a user 110, that is associated with a user device 105 (e.g., a smartphone, a mobile phone) and a portable device 115 (e.g., an access card, a credit card, a debit card, etc.).

The user 110 can conduct an interaction with a resource provider that operates an access device 120 (e.g., a smartphone). In some embodiments, the access device 120 may be a mobile phone, a point of sale device, a gate access device, a kiosk etc. The access device 120 may comprise an application 122 that provides transaction processing functionality and a reader 124 (e.g., a contactless interface such as an NFC interface) that can read information from the portable device 115. In some embodiments, the application 122 may be a merchant plug-in (MPI).

The access device 120 may also be in communication with an authorizing entity computer 150 via a transport computer 130 and a processing network computer 140. In some embodiments, the transport computer 130 may be an acquirer computer, the processing network computer 140 may be a payment processing network computer, and the authorizing entity computer 150 may be operated by an authorizing entity such as an issuer.

The access device 120 may also be in communication with a directory server 160 and an access control server 170. The directory server 160 may contain a directory that links different portions of credentials or tokens to different access control servers 170. For example, a credential such as a primary account number may contain sixteen characters, and the first six characters may indicate a specific access control server 170. In this regard, the directory server 160 can route messages between a plurality of different access devices and a plurality of different access control servers.

The access control server 170 is described in further detail below. The access control server 170 can be affiliated with the authorizing entity computer 150. For example, in some embodiments, the access control server 170 and the authorizing entity computer 150 can be operated by the same issuer.

The components in the system in FIG. 1 (as well as FIG. 2) can be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); HyperText Transfer Protocol (HTTP); and Secure Hypertext Transfer Protocol (HTTPS).

In step S102, the user 110 can use their portable device 115 to initiate an interaction (e.g., a transaction) with the access device 120. Information may be transferred from the portable device 115 to the access device 120 via the reader 124. For example, the user 110 can tap their portable device 115 against an NFC reader in the access device 120. The portable device 115 can then transmit a credential (e.g., a payment credential, an access identifier, etc.) or token, a verification code (e.g., a CVV, a dCVV), and optionally other information to the access device 120 via a wireless connection between the portable device 115 and the access device 120. This information can then be received by the application 122 on the access device 120.

In step S104, the access device 120 can generate and transmit an authentication request message to the directory server 160. The authentication request message can include the credential or token, a timestamp, and potentially other information. In some embodiments, the application 122 may be a merchant plug-in that provides a connection between the access device 120 and the directory server 160.

After receiving the authentication request message, the directory server 160 can identify an appropriate access control server 170. For example, the access control server 170 may by identified by analyzing a portion of the credential or token. The portion of the credential or token can be used to identify the particular access control server 170. For example, in some embodiments, if the credential is a primary account number or PAN, then the directory server 160 may identify the access control server 170 from the bank identification number (BIN) (e.g., the first six digits) of the PAN.

In step S106, after receiving the authentication request message and determining the appropriate access control server 170, the directory server 160 can transmit the authentication request message to the access control server 170. After receiving the authentication request message, the access control server 170 can parse the authentication request message. The access control server 170 can then identify the user 110. In some embodiments, the access control server 170 can identify the user 110 from the credential (e.g., from a PAN or bank account number) or token in the authentication request message. In this regard, the access control server 170 can have a database that maps a user's information (e.g., phone number, e-mail address, etc.) to one or more corresponding credentials or tokens.

In step S108, after the access control server 170 determines the address (e.g., an e-mail, phone number, IP address, etc.) of the user's user device 105, the access control server 170 can send a challenge message with a temporary code such as a one-time password (OTP) to the user device 105. In some embodiments, the OTP may be a 6-digit passcode. In other embodiments, the OTP may be an alphanumeric string of any length, or an image (e.g., a QR code or barcode). In some embodiments, the OTP may be sent, for example, by the access control server 170 to the user device 105 as an SMS message. In other embodiments, the OTP may be sent via an email, an automated phone call, or a push notification.

In step S110, the user 110 can enter the OTP that was received at the user device 105 into the access device 120. For example, the user 110 can type the OTP into the access device 120. In other embodiments, the OTP can be transferred to the access device 120 directly from the user device 105. For example, the access device 120 can scan a QR code with the OTP is displayed on the user device 105. Alternatively, the access device 120 can receive the OTP from the user device 105 via a contactless communication link (e.g., Bluetooth or NFC).

In step S112, after obtaining the OTP, the access device 120 can transmit an authentication request message comprising the OTP to the access control server 170 via the directory server 160.

In step S114, after receiving the authentication request message comprising the OTP, the access control server 170 can compare the OTP from the authentication request message to the OTP sent to the user device 105 in step S108. If the OTPs match, then the access control server 170 can authenticate the user 110 and the user device 105. After determining that the user 110 is authentic, the access control server 170 can also obtain (e.g., generate) an authentication indicator such as a cryptogram indicating that the user 110 has been authenticated. Alternatively, if the OTPs do not match, then the access control server 170 can generate an error message.

The cryptogram can be generated by cryptographically altering data. For example, data including the credential or token, and a variable data element such as a counter or timestamp, and optionally data regarding the access device (e.g., an access device identifier) may be encrypted with a cryptographic key to form the cryptogram. In some embodiments, the cryptographic key may be a symmetric key that is shared with the authorizing entity computer 150.

In some embodiments, the authentication indicator may be a code or binary value which indicates that the access control server 170 authenticated the user 110.

In step S116, the access control server 170 can transmit an authentication response message comprising the cryptogram (or other authentication indicator) or the error message to the access device 120 via the directory server 160. If the access device 120 receives an error message, the resource provider operating the access device 120 may end the interaction.

In step S118, after receiving the authentication response message with the cryptogram, the access device 120 can generate an authorization request message comprising the authentication indicator (e.g., the cryptogram), the credential or token, a verification value, an interaction value (e.g., a transaction amount), and possibly other information. In some embodiments, a bit may be included in the authorization request message to indicate that authentication of the user was performed. This bit could be in a form factor indicator data field or other data field. The access device 120 may then transmit the authorization request message to transport computer 130. In steps S120 and S122, the transport computer 130 can then send the authorization request message to the authorizing entity computer 150 via the processing network computer 140.

If the authorization request message comprises a credential such as a PAN, then the processing network computer 140 can determine the authorizing entity computer 150 from the credential and can transmit it to the authorizing entity computer 150. If the authorization request message comprises a token, then the processing network computer 140 can contact a token service computer (not shown) to obtain the real credential associated with the token.

In step S122, the processing network computer 140 can send the authorization request message to the authorizing entity computer 150, which may authorize (or decline) the transaction and generate an authorization response message.

In some embodiments, the approval of the authorization response message may depend upon the validity of the received credential (e.g., primary account number) and the validation of the cryptogram. For example, the authorizing entity computer 150 may decrypt the cryptogram using a cryptographic key that is shared with the access control server 170, and may recover various data elements. Such data elements may include the value or a counter that is shared with the access control server 170, the credential, or other data that are accessible to the authorizing entity computer 150. The approval of the authorization request message may also depend upon the amount of credit or funds in the account associated with the received credential. If the authentication indicator is a code or a binary value, then the authorizing entity computer 150 can use this in its decision to approve of the interaction.

In steps S124, S126, S128, the authorization response message may then be sent by the authorizing entity computer 150 to the access device 120 via the processing network computer 140 and the transport computer 130.

At a later date or time, the transport computer 130, the processing network computer 140, and the authorizing entity computer 150 may complete a clearing and settlement process for the interaction.

Figure 2:
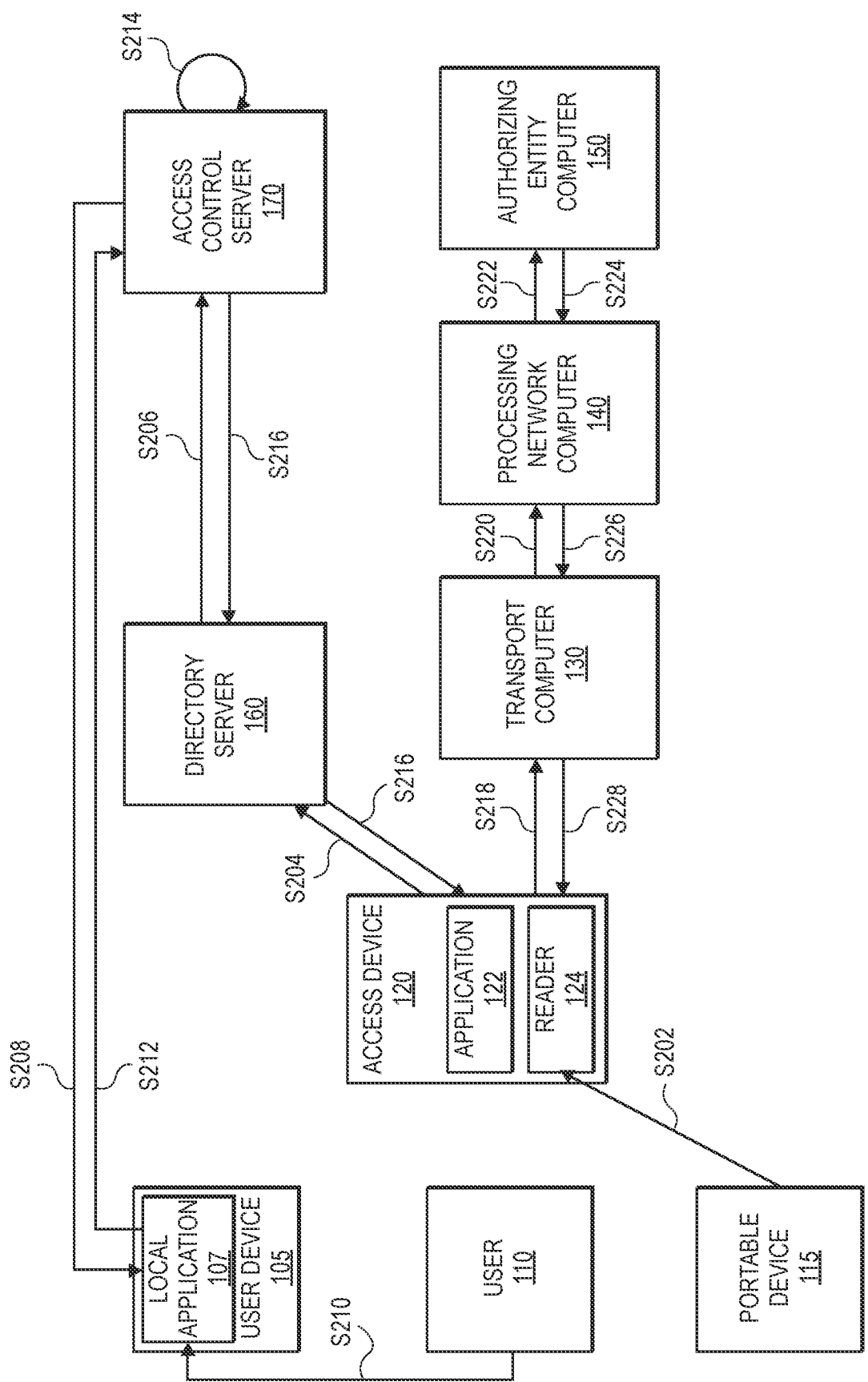
FIG. 2 shows block diagram of another system with another flow diagram according to another embodiment.

FIG. 2 shows a system and a flow diagram of another embodiment. The components of the system of FIG. 2 are similar to the components in FIG. 1, and descriptions need not be repeated.

In this embodiment, however, the user device 105 (e.g., a smartphone) may comprise a local application 107 such as an online bank application. For example, the local application 107 may be a mobile application associated with authorizing entity computer 150 and/or the access control server 170 that provides mobile banking capabilities to the user 110. The local application 107 may additionally or alternatively function as a mobile wallet.

In step S202, the user 110 can use their portable device 115 to initiate an interaction (e.g., a transaction) with the access device 120. Information may be transferred from the portable device 115 to the access device 120 via the reader 124. For example, the user 110 can tap their portable device 115 against an NFC reader in the access device 120. The portable device 115 can then transmit a credential (e.g., a payment credential, an access identifier, etc.) or token, a verification code (e.g., a CVV, a dCVV), and optionally other information to the access device 120 via a wireless connection between the portable device 115 and the access device 120. This information can then be received by the application 122 on the access device 120.

In step S204, the access device 120 can generate and transmit an authentication request message to the directory server 160. The authentication request message can include the credential or token, a timestamp, and potentially other information. In some embodiments, the application 122 may be a merchant plug-in that provides a connection between the access device 120 and the directory server 160.

After receiving the authentication request message, the directory server 160 can identify an appropriate access control server 170. For example, the access control server 170 may by identified by analyzing a portion of the credential or token. The portion of the credential or token can be used to identify the particular access control server 170. For example, in some embodiments, if the credential is a primary account number of PAN, then the directory server 160 may identify the access control server 170 from the bank identification number (BIN) (e.g., the first six digits) of the PAN.

In step S206, after receiving the authentication request message and determining the appropriate access control server 170, the directory server 160 can transmit the authentication request message to the access control server 170. After receiving the authentication request message, the access control server 170 can parse the authentication request message. The access control server 170 can then identify the user 110. In some embodiments, the access control server 170 can identify the user 110 from the credential (e.g., from a PAN or bank account number) or token in the authentication request message. In this regard, the access control server 170 can have a database that maps a user's information (e.g., phone number, e-mail address, etc.) to one or more corresponding credentials or tokens.

In step S208, the access control server 170 can send a challenge message comprising an out-of-band authentication request to the local application 107 of the user device 105. The challenge message may cause the local application 107 to prompt the user 110 to authenticate themselves. For example, the challenge message may be an SMS message that requests that the user log into the local application 107 using known login credentials including a username and a password (i.e., an example of a secret).

In step S210, the user 110 can authenticate themselves to the local application 107. For example, the user 110 can enter a password or PIN, or a biometric (e.g., a fingerprint, a facial scan) into the local application 107. The local application 107 can then authenticate the user 110. In some embodiments, the authentication process may be the same process that the user 110 uses to log in to the local application 107 under normal operation. In other embodiments, the local application 107 may present a window that can receive a secret from the user. To authenticate the user, the received secret may be compared to a secret stored in the local application 107 in the user device 105 or stored in an application server such as the access control server 170 or the authorizing entity computer 150.

In step S212, after receiving the secret, the local application 107 can send a challenge response message to the access control server 170. The challenge response message can comprise an indication that the user 110 was successfully authenticated or was not authenticated by the user device 105. In other embodiments, the challenge response message may comprise a secret that was entered by the user into the local application 107. The secret may subsequently be verified with the access control server 170 by comparing the received secret with the stored secret.

In step S214, the access control server 170 can verify that the user 110 was authenticated by the local application 107 or can verify a secret that was entered into the local application 107 by the user 110. If the user 110 is authenticated, the access control server 170 can obtain (e.g., generate) a cryptogram (or other authentication indicator) in the same or different manner as described above with respect to the embodiments in FIG. 1. If the user 110 was not successfully authenticated, the access control server 170 can generate an error message.

In step S216, after obtaining (e.g., generating) the cryptogram, the access control server 170 can transmit an authentication response message comprising the cryptogram (or other authentication indicator) or the error message to the access device 120 via the directory server 160. If the access device 120 receives an error message, the resource provider operating the access device 120 may end the interaction.

In step S218, after receiving the authentication response message with the cryptogram, the access device 120 can generate an authorization request message comprising the cryptogram (or other authentication indicator), the credential or token, a verification value, an interaction value (e.g., a transaction amount), and possibly other information. In some embodiments, the authentication indicator may be a bit that may be included in the authorization request message to indicate that authentication of the user was performed. This bit could be in a form factor indicator data field or other data field. The access device 120 may then transmit the authorization request message to transport computer 130. The transport computer 130 can then send the authorization request message to the authorizing entity computer 150 via the processing network computer 140.

If the authorization request message comprises a credential such as a PAN, then the processing network computer 140 can determine the authorizing entity computer 150 from the credential and can transmit it to the authorizing entity computer 150. If the authorization request message comprises a token, then the processing network computer 140 can contact a token service computer (not shown) to obtain the real credential associated with the token.

In step S222, the processing network computer 140 can send the authorization request message to the authorizing entity computer 150, which may authorize (or decline) the transaction and generate an authorization response message.

As explained above, the approval of the authorization response message may depend upon the validity of the received credential (e.g., primary account number) and the validation of the cryptogram. For example, the authorizing entity computer 150 may decrypt the cryptogram using a cryptographic key that is shared with the access control server 170, and may recover various data elements. Such data elements may include the value or a counter that is shared with the access control server 170, the credential, or other data that are accessible to the authorizing entity computer 150. The approval of the authorization request message may also depend upon the amount of credit or funds in the account associated with the received credential.

In steps S224, S226, S228, the authorization response message may then be sent by the authorizing entity computer 150 to the access device 120 via the processing network computer 140 and the transport computer 130.

At a later date or time, the transport computer 130, the processing network computer 140, and the authorizing entity computer 150 may complete a clearing and settlement process for the interaction.

In some embodiments, after the authentication has been completed, the result of the authentication may be embedded in chip data of the portable device 115 that is sent to the authorizing entity computer 150. This may be used by the authorizing entity computer 150 for authorization decisions. Alternatively, a record of the authentication process may be stored in a log stored in the directory server 160 and/or the access control server 170. The authorizing entity computer 150 may access these logs and retrieve information about the authentication for authorization or dispute resolution.

Figure 3:
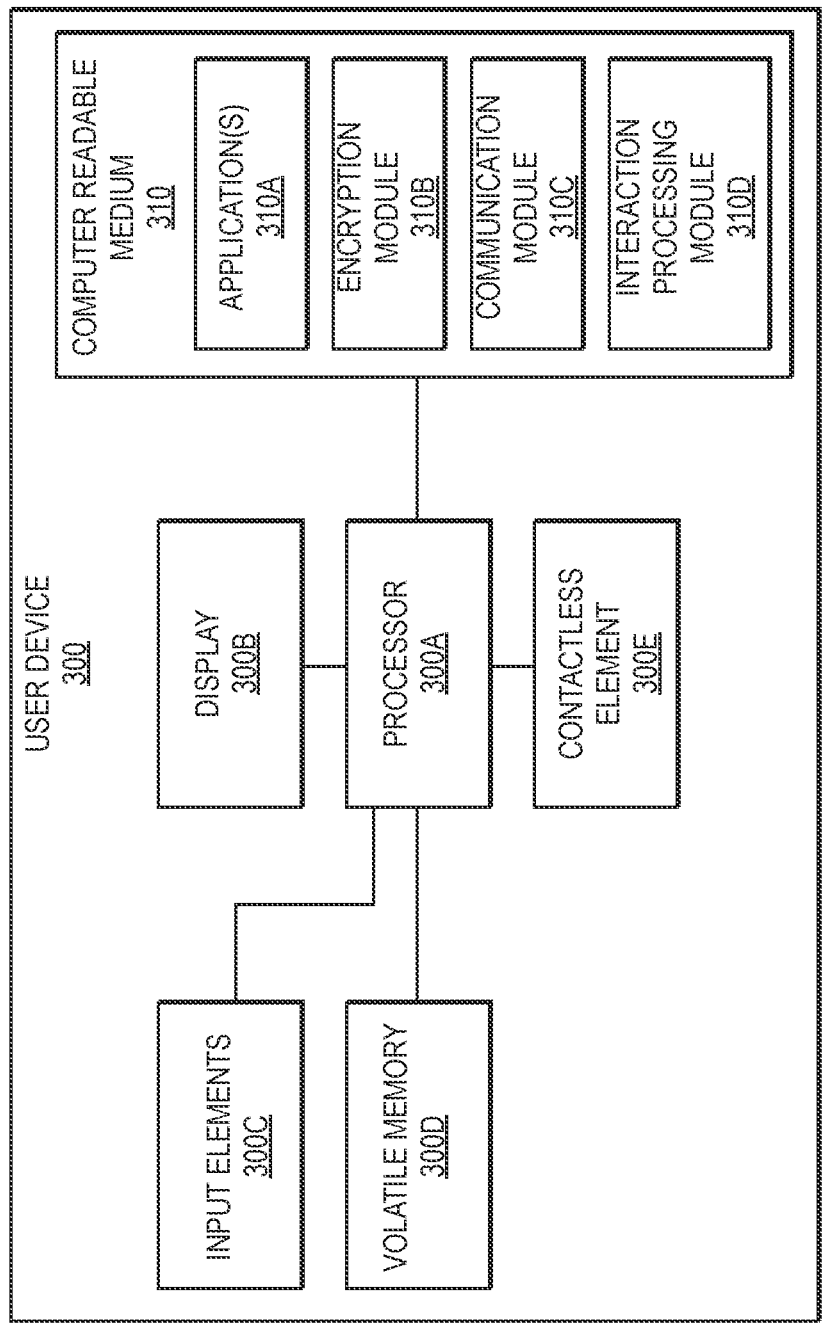
FIG. 3 shows a block diagram of a user device according to an embodiment.

FIG. 3 shows a block diagram of a user device 300 according to embodiments.

The user device 300 may include a processor 300A for processing functions of user device 300. The user device 300 may also include a display 300B and input elements 300C (e.g., a touchscreen, keyboard, biometric sensors, etc.) coupled to the processor 300A. The user device 300 may further comprise a volatile memory 300D (e.g., RAM, DRAM, EEPROM, etc.), a non-transitory computer readable medium 310, and a contactless element 300E, coupled to the processor 300A.

The processor 300A may comprise any suitable data computation device or devices. Processor 300A may be able to interpret code and carry out instructions stored on computer readable medium 310. Processor 300A may comprise a Central Processing Unit (CPU) operating on a reduced instructional set, and may comprise a single or multi-core processor. Processor 300A may also include an Arithmetic Logic Unit (ALU) and a cache memory.

In some embodiments, the contactless element 300E may be implemented in the form of a semiconductor chip (or other data storage element) with an associated wireless transfer (e.g., data transmission) element, such as an antenna. Contactless element 300E may be capable of transferring and receiving data using a short-range wireless communication capability (e.g., NFC).

The computer readable medium 310 may contain code, executable by the processor, for implementing the methods of embodiments. For example, the computer readable medium 310 may comprise code executable by the processor 300A for implementing a method comprising: receiving a temporary code, or receiving a challenge message, receiving a secret from a user, and verifying the secret or transmitting a challenge response message comprising the secret to an access control server.

The computer readable medium 310 may contain one or more access applications 310A (e.g., digital wallet application, mobile banking application maintained by an authorizing entity or payment processing network). Computer readable medium 310 may further contain a number of functional modules including an encryption module 310B, a communication module 310C, and an interaction processing module 310C.

The encryption module 310B can include code, executable by the processor 300A for performing cryptographic services, including encrypting or decrypting data (such as generating authorization response cryptograms), digitally signing data (such as commitment transactions), performing key exchanges, encrypting messages sent to other systems or devices, and the like.

The communication module 310C can include code, executable by the processor 300A to allow the user device 300 to communication with other external devices.

The interaction processing module 310D may include code, executable by the processor 300A to perform interaction processing such as transaction processing. It may include code for obtaining a credential or a token and then providing that to the contactless element for transmission to an access device.

Figure 4:
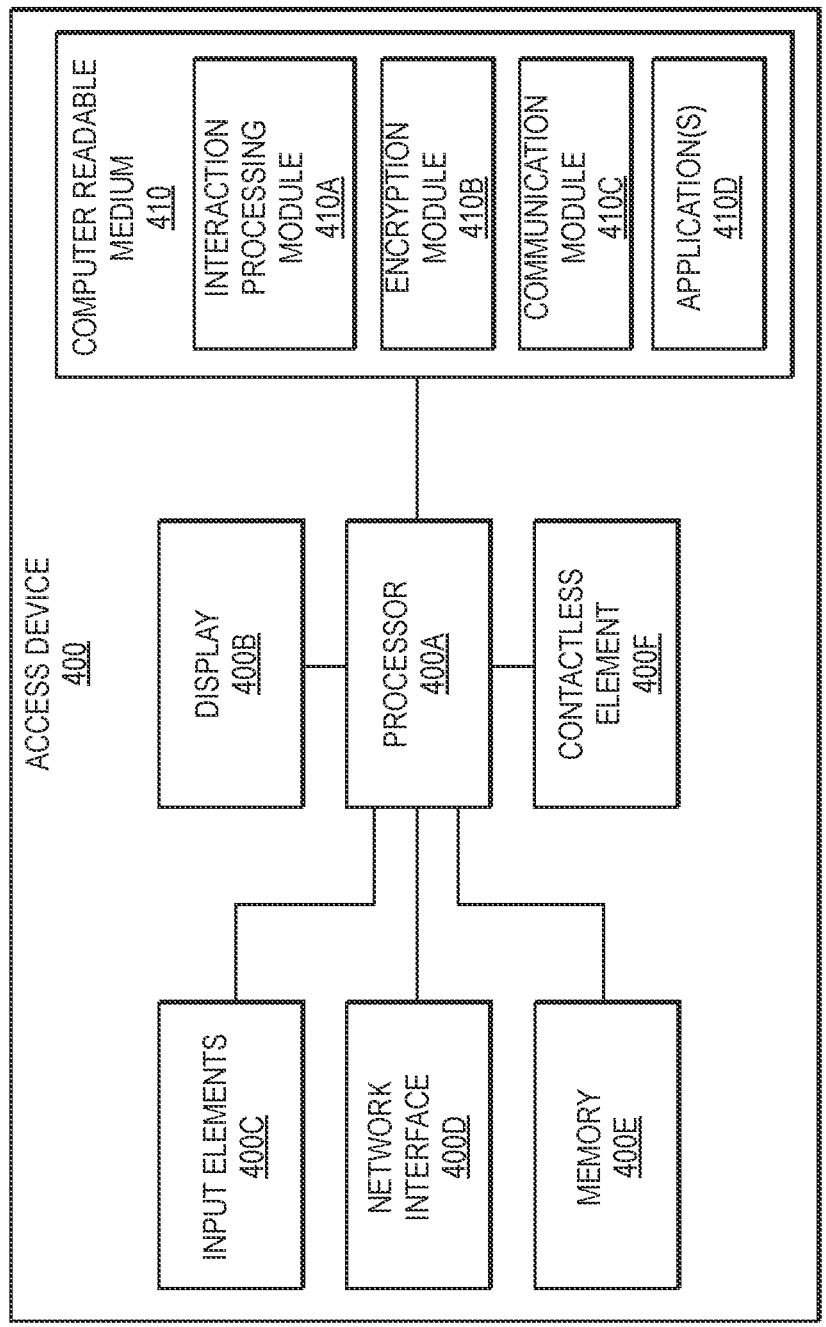
FIG. 4 shows a block diagram of an access device according to an embodiment.

FIG. 4 shows a block diagram of an access device 400 according to embodiments.

The access device 400 includes a processor 400A. The access device may also include a display 400B and input elements 400C (e.g., a touchscreen, PIN pad, microphone, portable device reader, etc.) coupled to the processor 400A. The access device 400 may further comprise a network interface 400D, a memory 400E, a contactless element 400F, and a computer readable medium 410 coupled to the processor. The contactless element 400F is configured to communicate with (e.g., send and/or received data) the contactless element 300E of the user device 300 using a short-range wireless communication capability (e.g., NFC).

The network interface 400D may include an interface that can allow the access device 400 to communicate with external devices (e.g., a user device, a processing computer, an acquirer computer).

The computer readable medium 410 may contain a number of modules to perform methods of embodiments including an interaction authorization module 410A, an encryption module 410B, a communication module 410C, and an application 410D.

The interaction authorization module 410A may comprise code, executable by the processor 400A to perform transaction authorization functions. Such functions may include generating authorization request message and receiving authorization response messages.

The encryption module 410B and the communication module 410C can be similar to the encryption module 310B and the communication module 310C and the descriptions thereof need not be repeated here.

The application 410D may be code, executable by the processor 400A for communicating with a directory server and an access control server. In some embodiments, the application 410D may be an MPI or merchant plug in if the access device is a point of sale terminal.

The computer readable medium 410 may comprise instructions executable by the processor, to cause the access device to: receive a credential or a token from a portable device associated with a user in an interaction; responsive to receiving the credential or the token from the portable device, transmit an authentication request message comprising the credential or the token to an access control server, which transmits a challenge message to a user device associated with the user; receive an authentication response message comprising an authentication indicator obtained by the access control server; and transmit an authorization request message comprising the authentication indicator, and the credential or the token to an authorizing entity computer, wherein the authorizing entity computer determines whether to authorize the interaction using the credential or the token, and the authentication indicator.

Figure 5:
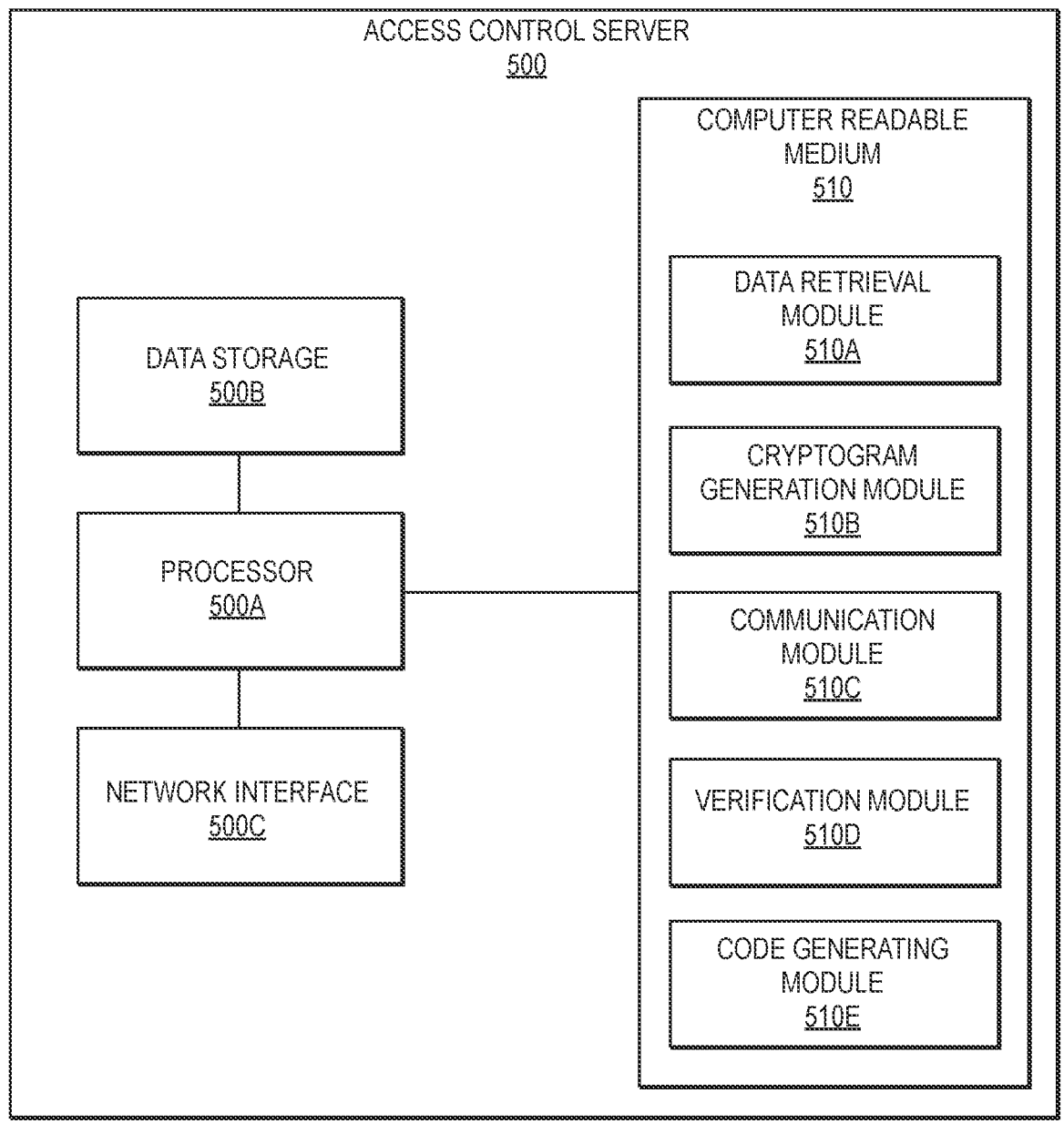
FIG. 5 shows a block diagram of an access control server according to an embodiment.

FIG. 5 shows a block diagram of an access control server 500 according to embodiments.

The access control server 500 includes a processor 500A for processing the functions of the access control server 500. The access control server 500 may also include a data storage 500B, coupled to the processor 500A. The access control server 500 may further comprise a network interface 500C that may include an interface that can allow the access control server 500 to communicate with external devices (e.g., an access device, a directory server computer, etc.), and which may be coupled to the processor 500A. The access control server 500 may further comprise a computer readable medium 510, which is coupled to the processor.

The data storage 500B may store mappings of credentials or tokens to user information. The data storage 500B may also store temporary codes (e.g., one-time passwords) as well as secrets of authentic users. The data storage 500B may also store various cryptographic keys for generating cryptograms.

The computer readable medium 510 may contain a number of software modules. The modules may include a data retrieval module 510A, a cryptogram generation module 510B, a communication module 510C, a verification module 510D, and a code generating module 510E.

The data retrieval module 510A may comprise code, executable by the processor 500A, to look up user information in the data storage 500B based upon a received user credential or token.

The cryptogram generation module 510B may comprise code executable by the processor 500A for generating one or more cryptograms, as described above.

The communication module 510C may comprise code, executable by the processor 500A, to allow the access control server 500 to communicate with other external entities.

The verification module 510D may comprise code, executable by the processor 500A, to perform any of the above described verification processes, including verification of secrets, digital certificates, user credentials or tokens, and the like. For example, the verification module 510 and the processor 500A can compare a received secret from a user to a stored secret to determine if the user is authentic. In another example, the verification module 510D and the processor 500A can compare a received temporary code to a previously generated temporary code.

The code generating module 510E may comprise code, executable by the processor 500A, to generate a code that can be used in the above described processes. The code generating module 510E may comprise code for a random number generator that can be used to generate temporary codes such as one-time passwords.

The computer readable medium 510 may comprise code, executable by the processor 500A, which causes the access control server 500 to perform a method comprising: receiving, by an access control server, an authentication request message comprising a credential or a token from an access device, after the access device receives the credential or the token from a portable device of a user; responsive to receiving the authentication request message, transmitting, by the access control server, a challenge message to a user device associated with the user; obtaining, by the access control server, an authentication indicator; and transmitting, by the access control server, an authentication response message comprising the authentication indicator to the access device.

Embodiments of the invention provide a number of advantages. Embodiments can allow an access device such as a smartphone, which may be less specialized than a point of sale terminal or other dedicated access device, to be used securely for processing transactions. In embodiments of the invention, a user's secret is never entered directly into an access device that may be unsecure. In the described embodiments, a temporary code may be provided to the user and entered into the access device. This code can be a one-time password which cannot be re-used by a hacker or fraudster. In other embodiments, the user need not enter anything into the access device, but can simply authenticate him/herself to a local application operated by the access control server on the user's own user device. In both cases, the user's secrets are protected and the user can use the access device to access any desired resource.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
receiving, by an access device, a credential or a token from a portable device associated with a user in an interaction;
responsive to receiving the credential or the token from the portable device, transmitting, by the access device, a first authentication request message comprising the credential or the token to an access control server via a directory server, wherein the access control server transmits a one-time password to a user device associated with the user;
receiving, by the access device, the one-time password from the user;
transmitting, by the access device, a second authentication request message comprising the credential or the token, and the one-time password to the directory server, which then transmits the second authentication request message to the access control server via the directory server, wherein the access control server generates an authentication response message comprising an authentication indicator after validating the one-time password;
receiving, by the access device from the access control server, the authentication response message comprising the authentication indicator from the access control server via the directory server; and
transmitting, by the access device, an authorization request message comprising the authentication indicator, and the credential or the token to a processing network computer.

2. The method of claim 1, wherein the authentication indicator is a cryptogram.

3. A method comprising:
receiving, by an access device, a credential or a token from a portable device associated with a user in an interaction;
responsive to receiving the credential or the token from the portable device, transmitting, by the access device, an authentication request message comprising the credential or the token to an access control server, wherein the access device transmits a challenge message to a user device associated with the user, and
wherein the challenge message comprises an out-of-band authentication request which requests the user to log into a local application on the user device by inputting a username, and a secret or biometric into the local application, which then grants the user access to the local application, and then generates and transmits a challenge response message including an indication that the user successfully logged into the local application to the access control server;
receiving, by the access device from the access control server, an authentication response message comprising an authentication indicator; and transmitting, by the access device, an authorization request message comprising the authentication indicator, and the credential or the token to a processing network computer.

4. The method of claim 1, receiving, by the access device, the credential or the token from the portable device associated with the user comprises receiving, by the access device, the credential from the portable device.

5. The method of claim 1, wherein the portable device is in the form of a card, and the user device is in the form of a phone.

6. The method of claim 1, wherein the portable device is within the user device.

7. The method of claim 1, wherein the authentication indicator is a cryptogram that is generated with a first symmetric key stored at the access control server and the cryptogram is validated at an authorizing entity computer in communication with the processing network computer using a second symmetric key stored at the authorizing entity computer.

8. The method of claim 1, wherein the user device is in the form of a vehicle.

9. The method of claim 1, wherein the user device is in the form of an automobile.

10. The method of claim 9, wherein the portable device comprises a contactless element that can communicate wirelessly with an RF reader in the access device.

11. The method of claim 3, wherein the user device is in the form of a vehicle.

12. The method of claim 3, wherein the challenge message is an SMS message.

13. The method of claim 3, wherein the local application is a banking application.

14. The method of claim 3, wherein the authorization request message comprises a primary account number.

15. The method of claim 3, wherein the authorization request message is transmitted to an authorizing computer by the processing network computer.

16. The method of claim 3, wherein the credential or the token is received by the access device from the portable device via NFC (near field communications).

17. The method of claim 3, wherein the access device is a mobile phone and the portable device is a card.

18. The method of claim 3, wherein user device is in the form of an automobile.

19. A method comprising:
receiving, by an access control server, an authentication request message comprising a credential or a token from an access device, after the access device receives the credential or the token from a portable device of a user;
responsive to receiving the authentication request message, transmitting, by the access control server, a challenge message to a user device associated with the user, wherein the challenge message comprises an out-of-band authentication request which requests the user to log into a local application on the user device by inputting a username and a secret or biometric into a local application on the user device, which then grants the user access to the local application;
receiving, by the access control server from the local application on the user device, a challenge response message including an indication that the user successfully logged into the local application;
obtaining, by the access control server, an authentication indicator; and
transmitting, by the access control server, an authentication response message comprising the authentication indicator to the access device.

20. The method of claim 19, wherein the authentication indicator is a cryptogram.

* * * * *